Figure 1:
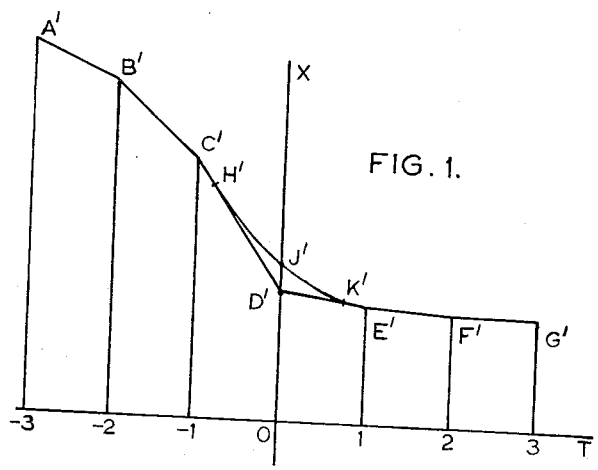

Oct. 27, 1964

D. E. TYZACK ETAL 3,154,674

INTERPOLATING ARRANGEMENTS ESPECIALLY FOR THE
AUTOMATIC CONTROL OF MACHINE TOOLS

Filed April 11, 1961

3 Sheets-Sheet 1

United States Patent Office 3,154,674
Patented Oct. 27, 1964

3,154,674
INTERPOLATING ARRANGEMENTS ESPECIALLY FOR THE AUTOMATIC CONTROL OF MACHINE TOOLS
Donald Ernest Tyzack, Chalfont St. Giles, and Frederick Walter Hartley, Hayes, England, assignors to Electric & Musical Industries Limited, Hayes, England, a company of Great Britain
Filed Apr. 11, 1961, Ser. No. 102,153
8 Claims. (Cl. 235—151)

This invention relates to interpolating arrangements especially for the automatic control of machine tools.

In the specification of United States Patent No. 2,929,555 there is described an interpolating device, especially for an automatic control mechanism for a machine tool, comprising means for deriving first input signals representing values of a first co-ordinate of succesive reference points defining a locus, means for deriving second input signals representing values of a second co-ordinate of successive reference points defining said locus, first interpolating means responsive to said first input signals for generating first output signals representing intermediate values of said first co-ordinate, second interpolating means for generating second output signals representing intermediate values of said second co-ordinate, said first and second interpolating means being arranged to generate the respective output signals as curvilinear functions of a common non-geometric parameter.

Each interpolating means usually comprises a combination of transformers for generating interpolated signals representing spaced points lying on a quadratic curve in response to signals representing three reference points of the curve, and an autotransformer producing signals representing closer points lying on a straight line joining adjacent spaced points represented by said interpolated signals. Each group of three reference points of the curve defines a span of the curve and successive spans have a common reference point.

When such an interpolating device is used to control the relative positions of a tool holder and a work carrier so that a desired outline or surface may be cut on a workpiece, it is probable that the interpolating device will need to operate over several spans one after the other to cause the desired locus to be cut. A span is the range of the interpolating device which can be achieved without switching the input signals, and usually is the section of the locus lying between the reference points represented by the input signals.

In order to obtain high accuracy in the complicated portions of the locus it is necessary to use a relatively short span length, whereas in the interests of efficiency it is desirable to use a relatively long span length on less complicated portions of the locus so as to achieve the required accuracy of the finished product, without having to programme many more reference points than necessary. However, if the cutting speed is to be maintained at a constant or substantially constant value as would be essential if a flame cutter is used this involves altering the rate of change of the interpolator parameter. Moreover when changing from a long span to a short one, or vice versa, the rate of change of the interpolator parameter is required to change instantaneously from the first rate to the second at the junction point, in order to maintain the cutting speed at a constant value. Since this is not possible because of the inertia of the switches, motor and tachogenerator on the interpolator parameter shaft, it is likely that there will be a jerk in the movement of the cutter relative to the workpiece on the machine tool, possibly causing damage to the workpiece.

It is the object of the present invention to provide an arrangement whereby this disadvantage is overcome and the need for instantaneous changes in the rate of change of the interpolator is removed.

According to the present invention, an interpolating arrangement comprises two interpolating means having terminals for input signals so arranged that sets of input signals can be applied alternately to said means and having a selector movable to derive an output signal alternately from said means in such a way that the output signal varies to represent interpolated values of functions defined by the sets of input signals and by the interpolating means, and wherein means are provided to cause the output signal to vary smoothly from a value of the function interpolated by one interpolating means, to a value of the function interpolated by the other interpolating means whilst the selector moves through a range of positions which includes the change over from one interpolating means to the other but is small compared with the total range of positions of the selector.

According to a preferred form of the present invention there is provided an interpolating arrangement comprising first means for generating signals representing values of a co-ordinate at a first set of successive spaced points of a first locus terminating at a junction point, second means for generating signals representing values of said so-ordinate at a second set of successive spaced points of said first locus beginning at said junction point, selector means for selecting signals from said first means at a first rate, and from said second means at a second rate, wherein means are provided for describing a second locus connecting a point of said first set with a point of said second set, tangential to said first locus at said two points, at a smoothly varying or constant rate, so that there are no discontinuities in the velocities at said two points.

Figure 3:
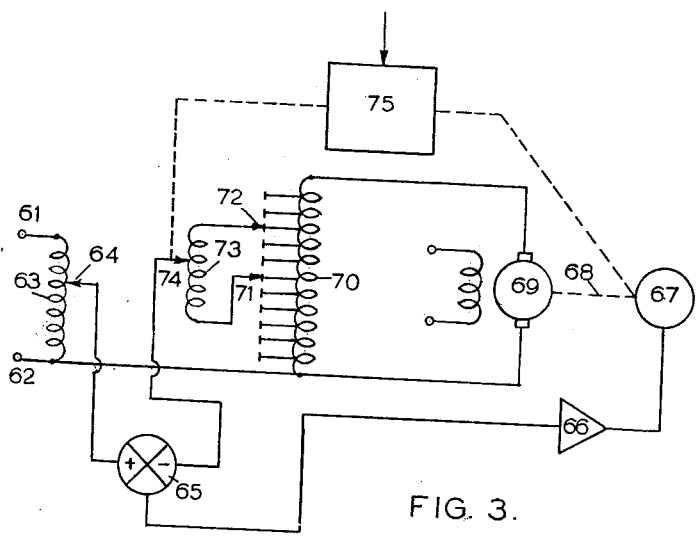
Figure 2:
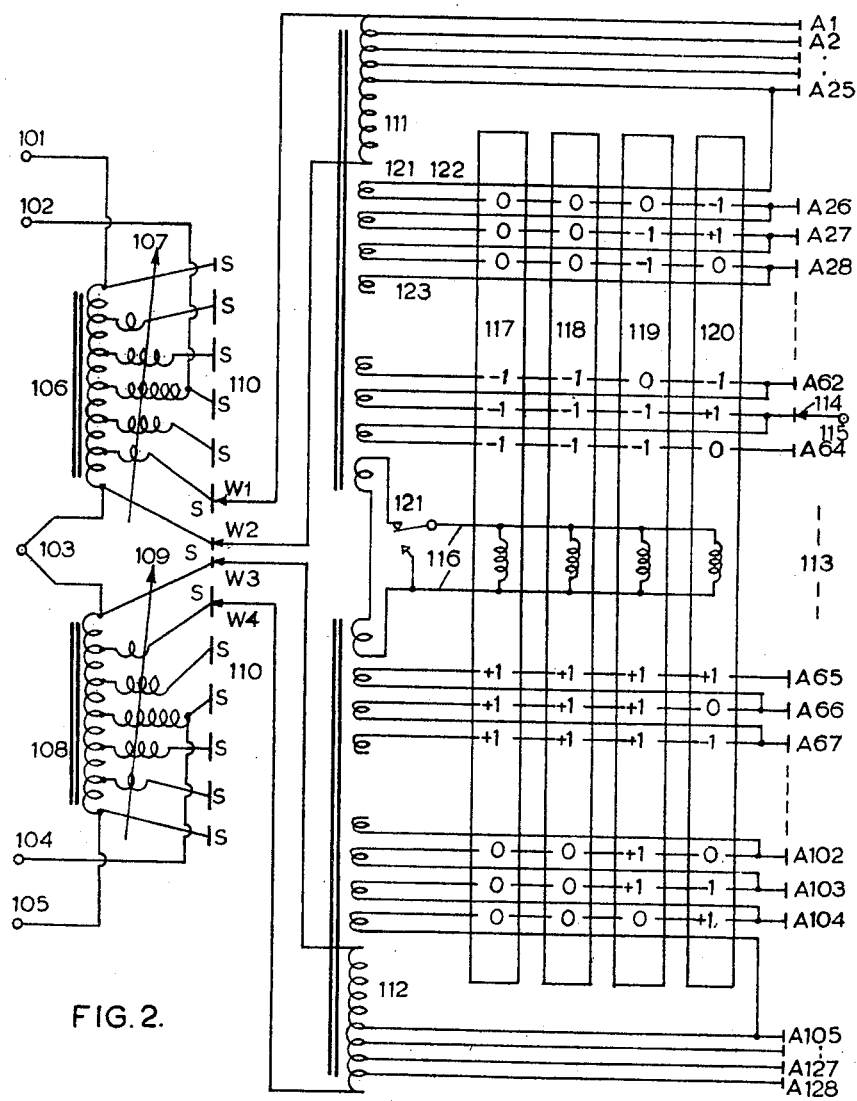
Figure 4:
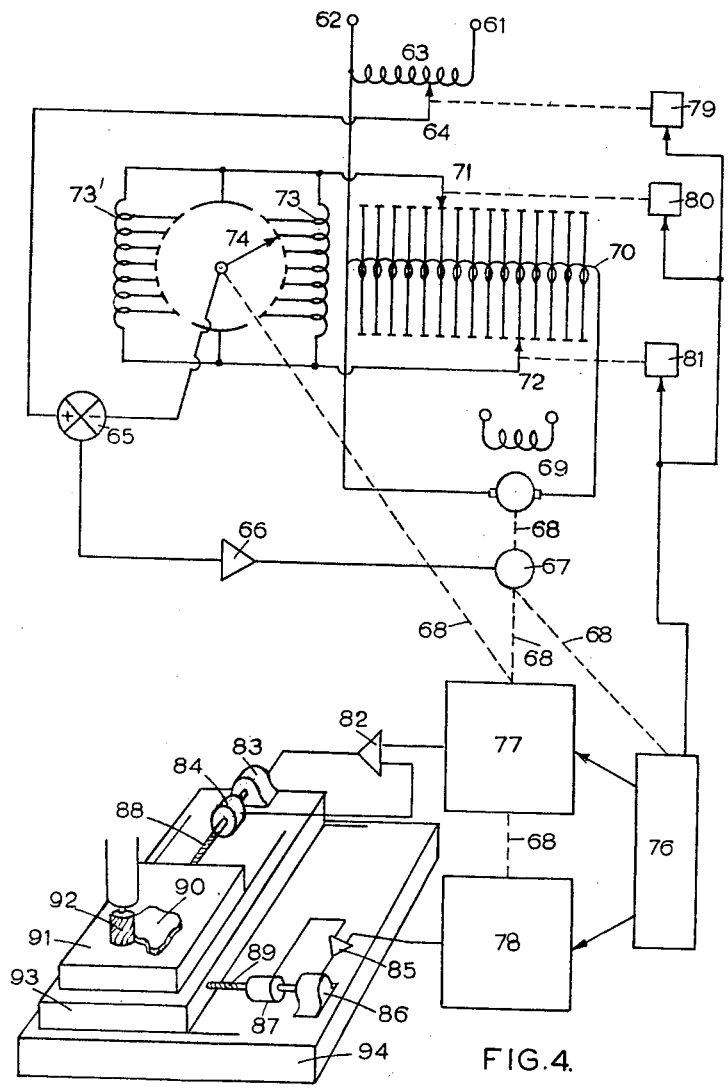

In order that the invention may be fully understood and readily carried into effect it will now be described in greater detail with reference to the accompanying drawings, in which:

FIGURE 1 is a graph explanatory of the operation of a preferred embodiment of the present invention, FIGURE 2 is a diagram of a preferred embodiment of the present invention, FIGURE 3 is the circuit diagram of a speed control unit for an interpolating arrangement such as that shown in FIGURE 2, and FIGURE 4 is a diagram of a machine tool fitted with an automatic control system using an interpolator according to the present invention.

Referring to FIGURE 1 the ordinate of the graph is one co-ordinate of the locus which the mechanism is required to generate. Let the co-ordinate be $x$. The abscissa of the graph represents the parameter of the interpolator with respect to which the interpolation is performed. The interpolator may be of the type described in the above mentioned specification.

The graph shows the junction between two spans at a point D', the last part of the first span being represented by the line A'B'C'D' and the first part of the second span by the line D'E'F'G'. The parameter T changes by one unit for each sub-span such as A'B'. The points A', B', C', D', E', F', and G' represent output voltages of interpolators, A'B'C'D' from one interpolator and D'E'F'G' from another.

At the point D' it is evident from the drawing that the rate of change of $x$ with respect to T changes suddenly by a considerable amount, as is indicated by the angle between the lines C'D' and D'E'. In order to avoid a corresponding sudden change in $$\frac{dx}{dt}$$

the rate of change of with respect to time, at the point D' where $$\frac{dx}{dT}$$

changes from a large value to a small one, the interpolator speed $$\frac{dT}{dt}$$

must change instantaneously from a small value to a large one so that the product $$\frac{dx}{dT} \cdot \frac{dT}{dt}$$

is continuous at the point D'.

If, however, $$\frac{dx}{dT}$$

is arranged to change gradually over part of the last sub-span of the first span and part of the first sub-span of the second span, a relatively gradual acceleration of interpolator speed $$\frac{dT}{dt}$$

over the same two sub-spans may be used to produce the desired change in interpolator speed without introducing any discontinuities into $$\frac{dx}{dt}$$

Similar considerations apply to the other co-ordinates.

The change in interpolator speed required at a span change point such as D' is usually determined by the relative lengths of the spans adjacent to the point D' so that the cutting speed is maintained at a constant value over the spans. In other words, the change in $$\frac{dT}{dt}$$

is introduced to maintain $$\frac{ds}{dt}$$

constant despite a change in $$\frac{ds}{dT}$$

When $$\frac{ds}{dt}$$

is maintained constant changes in $$\frac{dx}{dt}$$

and $$\frac{dy}{dt}$$

compensate for one another in such a way that $$\left[\left(\frac{dx}{dt}\right)^2 + \left(\frac{dy}{dt}\right)^2\right]^{\frac{1}{2}}$$

is constant; this is easier to achieve if the changes in $$\frac{dx}{dt}$$

and $$\frac{dy}{dt}$$

are gradual.

The arrangement shown in FIGURE 2 comprises an interpolating device of the type described in the specification of United States Patent No. 2,929,555 modified in accordance with the present invention. Referring now to FIGURE 2, alternating voltages from five stores, which may be of the type described in the specification of United States patent application No. 620,145 representing values of one co-ordinate, say x, of five points of a locus, are applied to five terminals 101, 102, 103, 104 and 105. The terminals 101, 102 and 103 are associated with the reference points of a first span of the locus, and the terminals 103, 104 and 105 are associated with the reference points of a second span of the locus, adjacent to the first, the two spans meeting at the span change point associated with the terminal 103. In FIGURE 1 the points A'B'C'D' define the ends of sub-spans of the first span, and the points D'E'F'G' define the ends of sub-spans of the second span, the point D' being the span change point.

The terminals 101, 102 and 103 are connected to the input points of a quadratic interpolator of the type described in the specification of United States Patent Number 2,928,604 comprising an autotransformer 106 having a number of equally spaced taps, from which the output signals are obtained via the quadratically related windings of a second transformer whose inductive coupling is indicated by the arrow 107. The terminals 103, 104 and 105 are connected to a second interpolator of the same type comprising an autotransformer 108 and a further transformer whose coupling is indicated by the arrow 109.

The output signals from these interpolators are applied to the studs S of a rotary switch 110, having wipers W1, W2, W3 and W4 which scan the studs cyclically. The switch 110 is shown in diagrammatic form for clarity, but it is so arranged that the pair of wipers W1 and W2 connect to alternate pairs of adjacent studs S in turn and the pair of wipers W3 and W4 connect to the remaining pairs of adjacent pairs of studs S in turn, in such a way that at one time W1 and W2 occupy a pair of adjacent studs S, W3 occupies the same stud as W2 and W4 occupies the stud adjacent that occupied by W2 and W3, but different from the one occupied by W1. When W1 and W2 are stepped over W3 and W4, W1 and W4 lie on the same stud. A switch of this type and its operation is described more fully with reference to FIGURE 9 of the specification of United States Patent No. 2,928,604. The wipers W1 and W2 are connected to the end terminals of a transformer winding 111. The wipers W3 and W4 are connected to the end terminals of a second transformer winding 112. The windings 111 and 112 each have 192 turns, and are not inductively coupled to one another.

The winding 111 has output taps spaced at three turn intervals over the first 72 turns adjacent to the end of the winding connected to the wiper W1. These output taps are connected to the studs A1 to A25 of a 128 stud switch 113, which has a wiper 114 which scans the studs cyclically and applies the voltages therefrom to an output terminal 115. The stud A1 is connected to the end terminal of the winding 111 to which W1 is connected, A2 is spaced three turns from it along the winding, A3 is spaced three turns from A2 and so on.

Similarly, the winding 112 has ouput taps spaced at three turn intervals over the last 72 turns of the winding and which are connected to the studs A105 to A128 of the switch 113 so that A128 is spaced three turns from the end terminal of the winding 112 to which the wiper W4 is connected, A127 is spaced three turns from A128 and so on.

Four other transformers 117, 118, 119 and 120 are indicated by rectangles in the drawing, and are coupled to the windings 111 and 112 by means of the link 116 in such a way that there are induced into single turn windings on the transformers 117, 118, 119 and 120, voltages respectively equal to $\frac{1}{3}$, $\frac{1}{9}$, $\frac{1}{27}$, and $\frac{1}{81}$ of the difference between the voltage induced into three turns on the transformer 111, and the voltage induced into three turns on the transformer 112.

The stud A25 is connected via the three turn winding 121 coupled to the winding 111 and a single turn on the transformer 120 to the stud A26. The stud A26 is connected via a three turn winding 122 coupled to the winding 111, and single turn windings on transformers 119 and 120 to the stud A27. The stud A27 is connected via a three turn winding 123 and a single turn winding on transformer 119 to the stud A28. This interconnecting between studs continues for all the studs A25 to A64, so that adjacent studs of the group A25 to A64 are connected to each other via a three turn winding coupled to the winding 111 and single turn windings on selected ones of the transformers 117, 118, 119 and 120. The windings on the four transformers 117 to 120 are arranged to inject successively increasing fractions of the difference between the voltages across the windings 111 and 112. The numbers of turns on the transformers form a symmetric ternary representation of the numbers −1 to −39. The number included in the rectangle and on the line of the connection between the studs A and the windings coupled to the winding 111 indicates the number of turns included in the lead, the sign of the number indicating the sense of the winding and therefore the polarity of phase of the voltage induced into the lead.

The studs A65 to A105 are connected together in a similar way to the studs A25 to A64, the numbers of turns of the windings on the transformers 117 to 120 forming a symmetric ternary representation of the numbers 1 to 40.

When the wipers W1, W2, W3 and W4 are in the positions shown in FIGURE 2 and the voltages applied to the terminals 101, 102, 103, 104 and 105 correspond to reference points of spans, parts of which are shown in FIGURE 1, the voltage applied to W1 corresponds to the point C' of FIGURE 1, that applied to W2 and W3 corresponds to the point D', and that applied to W4 corresponds to the point E'. As the wiper 114 scans the studs A, starting at A1, for the first 25 studs the output voltage appearing at terminal 115 corresponds to the section C'H' of the line C'D'. As the wiper moves from A25 to A26 the output voltage at 115 corresponds to a point slightly displaced from the line C'D' owing to the voltage induced in the single turn winding on the transformer 120 and connected between A25 and A26. As the wiper 114 progresses towards A64 larger proportions of the difference between the voltages across the windings 111 and 112 are injected into the connection between adjacent studs so that the voltage appearing on the terminal 115 describes a locus corresponding to C'J' in FIGURE 1. Since the rate of deviation of the voltages on the studs A25 to A64 linearly increases the curve H'J' will be a quadratic curve, that is a parabola.

The portion of the curve J'K' of FIGURE 1 will be described as the wiper 114 moves over the studs A65 to A104 and an exactly similar way to the described above. Finally the wiper 114 moving over the studs A105 to A108 the output voltage at 115 describes the section of the straight line D'E' represented by K'E'.

If the span blending facility as provided by the present invention, is not required the switch 121 in the link 116 may be switched over manually, in response to a signal from the programme tap, or in response to the position of the interpolar shaft so that the span blending occurs only between spans and not between sub-spans within a single span. The action of the switch 121 is to disconnect the transformers 117, 118, 119 and 120 from the transformers 111 and 112, and to short circuit the transformers 117 to 120.

The purpose of the straight sections C'H' and K'E' is to allow time for the wipers W1 and W2 to be stepped over W3 and W4, or vica versa; it being only possible to perform this stepping when the output voltage at 115 depends on the voltage applied to one pair of wipers W1 and W2 or W3 and W4 alone.

The apparatus shown in FIGURE 3 is intended to be used in conjunction with that shown in FIGURE 2 to produce the requisite gradual change of $$\frac{dT}{dt}$$

An alternating voltage of reference amplitude is applied via the terminals 61 and 62 across the inductive potentiometer 63 which carries a wiper 64. The wiper 64 is connected to one input of a differential circuit 65 the output of which is amplified by the servo amplifier 66 to drive the servo motor 67. The motor 67 drives a shaft 68 which is coupled to the switches 110 and 113 of FIGURE 2. Thus, the angular velocity of the shaft 68 is $$\frac{dT}{dt}$$

Also coupled to the shaft 68 is a tachometer 69, energised by the source of reference voltage, the output of which is applied across the tapped autotransformer 70. Two wipers 71 and 72 each connected to one end terminal of an inductive potentiometer 73, co-operate with the tappings of the autotransformer 70. The wiper 74 of the inductive potentiometer 73 is connected to the second input of the differential circuit 65. The terminal 62 is connected to one end of the autotransformer 70 so that the two inputs to 65 are applied in the correct phase.

In operation, the wiper 64 is set, either manually or in response to a coded signal on the instruction tape, to a position representing the interpolator speed which, when taken in conjunction with a standard span length, produces the desired cutting speed. The wipers 71 and 72 are set to tappings of the autotransformer 70 representing the lengths of the span before and the span after the junction point D' respectively, manually, from the programme tape directly, or in response to the span length as represented by the reference points. The wiper 74 is geared to the interpolator shaft 68 in such a manner that it is connected to the end of the winding 73 to which the wiper 71 is also connected at the position of the shaft 68 corresponding to the point H', it scans the winding 73 as the curve H'J'K' is followed reaching the other end of the winding 73 at the point K'.

The circuit operates as the normal velocity servo mechanism so that when 74 connects with 71 the shaft 68 rotates at a speed proportional to the demanded cutting speed as represented by the position of 64, divided by the span length before the junction point D'. The wiper 74 remains connected to the end of the winding 73 to which the wiper 71 is connected until the point H' is reached when it is coupled to the shaft 68 by means of a clutch 75 in response to a signal derived from the shaft 68 when it is at the position corresponding to H' and to a further signal produced manually or in response to the programme tape indicating that a change of interpolator speed is required. As the wiper 114 of the switch 113 moves from stud A25 to A105 with the rotation of the shaft 68, so 74 moves over 73 towards the end of 73 to which 72 is connected so the shaft 68 changes speed and keeps the cutting speed constant as the curve H'J'K' is described.

When 74 reaches the end of the winding 73 it is disconnected from the shaft 68 by disengagement of the clutch 75 in response to a signal derived from the shaft 68 which indicates that the locus has reached the point K', and maintains the new interpolator speed until a further change is required.

The wiper 74 may be arranged to traverse the winding 73 in opposite directions alternately as speed changes are required, by means of a gear box associated with the clutch 75, the free one of the wipers 71 and 72 being re-positioned before the speed change is required. In an alternative arrangement the winding 73 may consist of two sections, both connected between the wipers 71 and 72 so that the wiper traverses them alternately continuously, with the rotation of the shaft 68, two relays operated in response to a command signal and to the position of the shaft 68, being provided selectively to connect the differential circuit 65 to one of the wipers 71 or 72 instead of to the wiper 74.

In other embodiments of the present invention the curve H'J'K' may take forms other than a parabola. In such cases the windings 73 will be arranged to be tapped non-linearly in a suitable manner, so that the cutting speed is maintained at a constant value.

FIGURE 4 shows another speed control circuit which may be used in conjunction with interpolating arrangements of the form illustrated in FIGURE 2. Compared with the FIGURE 3 arrangement the winding 73 has been modified by the provision of a further winding 73', the two windings 73 and 73' being connected to studs of a rotary switch, in which two blocks of studs are connected, one to the wiper 71 and the other to the wiper 72, these blocks of studs corresponding to the straight sections C'H' and K'E' of the locus. This arrangement obviates the necessity for the relays to connect the wipers 71 and 72 to the differential circuit 65 as described above. The wiper 74 is geared to rotate with the shaft 68 and scans the contacts continuously, and each of the wipers 71 and 72 is set to its new position whilst the wiper 74 contacts the block of studs connected to the other.

The block 76 represents the programme tape reader and control circuitry for the machine tool. The block 77 represents the interpolator for the x-co-ordinate direction and consists of the apparatus shown in FIGURE 2 together with the associated stores and switches. The block 78 represents the interpolator for the y-co-ordinate direction.

The wipers 64, 71 and 72 are positioned in response to signals derived from the programme tape by means of apparatus represented by the blocks 79, 80 and 81.

The mechanical parts of the machine tool are represented in diagrammatic form and show a workpiece 90 mounted on the worktable 91 being cut by the tool 92. The worktable is arranged to move in the x-co-ordinate direction relative to the tool 92 in response to signals derived from the block 77 which are amplifier by the amplifier 82 and control the servo motor 83. The motor 83 rotates a lead screw 88 which positions the worktable in the x direction and also operates the feedback unit 84 which provides the position analogue signal which is compared with the output signal of the block 77 by the amplifier 82. The worktable 91 is mounted on a slide 93 which is positioned in the y-direction by the lead screw 89 which is rotated by the motor 86 in response to the difference between the y-co-ordinate signal from the block 78 and the position analogue signal from the feedback unit 87, amplified in 85.

What we claim is:

1. An interpolating arrangement comprising first interpolating means responsive to input signals for generating signals representing values of a co-ordinate at a first set of succesisve spaced points of a first locus terminating at a junction point, second interpolating means responsive to input signals for generating signals representing values of said co-ordinate at a second set of successive spaced points of said first locus beginning at said junction point, selector means for selecting signals from said first means at a first rate, and from said second means at a second rate, and means for describing a second locus connecting a chosen point of said first set with a chosen point of said second set at a smoothly varying or constant rate, so that there are no discontinuities in the rate of change of said co-ordinate value between said two chosen points, said means for describing a second locus including means arranged to add to the signals representing co-ordinate values of said points signals representing progressively increasing fractions of the difference in the co-ordinate values of said second set of points and to subtract signals representing progressively increasing fractions of the difference in the co-ordinate values of said first set of points, as said selector progresses from the chosen point of said first set to the chosen point of said second set.

2. An interpolating arrangement according to claim 1 wherein said adding means comprises a transformer.

3. An interpolating arrangement comprising first interpolating means responsive to input signals for generating signals representing values of a co-ordinate at a first set of successive spaced points of a first locus terminating at a junction point, second interpolating means responsive to input signals for generating signals representing values of said co-ordinate at a second set of succesive spaced points of said first locus beginning at said junction point, selector means for selecting signals from said first means at a first rate, and from said second means at a second rate, and means for describing a second locus connecting a chosen point of said first set with a chosen point of said second set at a smoothly varying or constant rate, so that there are no discontinuities in the rate of change of said co-ordinate value between said two chosen points said means for describing a second locus including means for deriving a signal representing the difference between the difference in the co-ordinate values of points of said first set and the difference in the co-ordinate values of points of said second set, and means for adding progressively increasing fractions of said difference signal to the signals representing the co-ordinate values at said points, as said selector progresses from the chosen point of said first set to the chosen point of said second set.

4. An interpolating arrangement comprising two interpolating means having terminals for input signals so arranged that sets of input signals can be applied to said interpolating means alternately, each said interpolating means having a series of output contacts from which may be derived interpolated signals representing a series of interpolated values of functions defined by the sets of input signals and the interpolating means, selector means co-operating with said contacts for deriving therefrom two pairs of interpolated signals, two linear sub-interpolating means connected to said selector means to interpolate between a respective pair of interpolated signals, means for deriving an output signal from said sub-interpolating means alternately, and transformer means responsive to the interpolated signals applied to both said sub-interpolating means for selectively modifying said output signal.

5. An arrangement according to claim 4 wherein said transformer means comprises means for producing an incremental signal proportional to the difference between the last pair of said series of signals from one interpolating means decreased by the difference between the first pair of said series of signals from the other interpolating means, and means for injecting successively varying fractions of said incremental signal to the output of said linear sub-interpolating means.

6. An arrangement according to claim 5 wherein said injecting means comprises transformers having series of secondary windings arranged according to a symmetric ternary scale of notation.

7. An arrangement according to claim 4 comprising two further interpolating means similar to said first mentioned two interpolating means and having a selector movable in unison with said first mentioned selector, said first mentioned two interpolating means and said further two interpolating means being arranged respectively to produce interpolated values of two co-ordinates of successive points on a locus, said values being interpolated as functions of a common parameter, the value of which is represented by the positions of the respective selector means, and wherein the rate of operation of said selector means is caused to vary in such manner as to tend to maintain the rate of description of said locus substantially constant.

8. An arrangement according to claim 4, comprising means for smoothly varying the rate of operation of said means for deriving an output signal from said sub-interpolating means.

(References on following page)

References Cited in the file of this patent

UNITED STATES PATENTS

| | | | |
|---|---|---|---|
| 2,883,110 | Spencer et al. | Apr. 21, | 1959 |
| 2,928,604 | Dudman et al. | Mar. 15, | 1960 |
| 2,929,555 | Spencer et al. | Mar. 22, | 1960 |
| 2,944,737 | Cail et al. | July 12, | 1960 |
| 2,949,232 | Spencer | Aug. 16, | 1960 |
| 2,950,864 | Spencer | Aug. 30, | 1960 |
| 2,961,161 | Spencer et al. | Nov. 22, | 1960 |
| 3,003,699 | Cail et al. | Oct. 10, | 1961 |
| 3,009,642 | Spencer | Nov. 21, | 1961 |
| 3,010,656 | Spencer | Nov. 28, | 1961 |
| 3,021,075 | Spencer | Feb. 13, | 1962 |
| 3,022,953 | Udall | Feb. 27, | 1962 |